(12) United States Patent
Sokolov

(10) Patent No.: US 6,961,933 B2
(45) Date of Patent: Nov. 1, 2005

(54) REPRESENTATION OF JAVA DATA TYPES IN VIRTUAL MACHINES

(75) Inventor: Stepan Sokolov, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 595 days.

(21) Appl. No.: 09/999,520

(22) Filed: Oct. 24, 2001

(65) Prior Publication Data

US 2003/0079049 A1    Apr. 24, 2003

(51) Int. Cl.⁷ ............................................. G06F 9/44
(52) U.S. Cl. ......................... 718/1; 717/116; 717/100; 717/118
(58) Field of Search .................. 719/315–316; 718/1; 717/114–118, 100

(56) References Cited

U.S. PATENT DOCUMENTS 4,645,916 A * 2/1987 Raisleger .................. 235/494
6,018,628 A * 1/2000 Stoutamire ................. 717/147
6,076,090 A * 6/2000 Burroughs et al. ......... 707/102
6,112,207 A * 8/2000 Nori et al. .................. 707/101
6,557,023 B1 * 4/2003 Taivalsaari .................. 718/1

OTHER PUBLICATIONS

Lindholm et al., "The Java™ Virtual Machine Specification," (Sep, 1996), Sun Microsystems, Inc., Chapters 1–10 (173 pp.).

* cited by examiner

Primary Examiner—Lewis A. Bullock, Jr.
(74) Attorney, Agent, or Firm—Beyer Weaver & Thomas, LLP

(57) ABSTRACT

Improved techniques for representation of Java data types in Java computing environments are disclosed. A word consisting of four bytes is used to represent primitive and non-primitive Java data types. As will be appreciated, the Java data type representations can be used by a Java virtual machine to efficiently represent various Java data types encountered in Java computing environments. As a result, various components that can represent Java data types (e.g., signatures of Java methods) can efficiently be constructed.

22 Claims, 5 Drawing Sheets

REPRESENTATION OF JAVA DATA TYPES IN VIRTUAL MACHINES

BACKGROUND OF THE INVENTION

The present invention relates generally to object-based high level programming environments, and more particularly, to techniques for tracking references to objects defined in object-based high level programming environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web"), which is an interface protocol for the Internet which allows communication of diverse computer platforms through a graphical interface. Computers communicating over the Web are able to download and execute small applications called applets. Given that applets may be executed on a diverse assortment of computer platforms, the applets are typically executed by a Java™ virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

FIG. 1A shows a progression of a simple piece of Java source code through execution by an interpreter, the Java virtual machine. Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler 103 outputs a Java class file 105 that includes the Bytecodes for the Java program. The Java class file 105 is input into a Java virtual machine 107. The Java virtual machine 107 is an interpreter that decodes and executes the Bytecodes in the Java class file 105. The Java virtual machine 107 is an interpreter, but is commonly referred to as a virtual machine as it emulates a microprocessor or computer architecture in software (e.g., the microprocessor or computer architecture may not exist in hardware).

Typically, the data types supported by the Java programming language are supported by Java virtual machine implementations. This means that both primitive and reference Java data types are supported by Java virtual machine implementations. The primitive Java data types are relatively simpler and include integral types (e.g., byte, short, int, long, char). As such, the values of the integral types of the Java virtual machines are the same as those for the integral types of the Java programming language. However, the reference data types have values that can be references to dynamically created class instances or arrays (or class instances, or arrays that implement interfaces). It should also be noted that the reference data types are internally represented by the virtual machine.

In any case, the virtual machine needs to represent data types for various reasons, for example, to represent method signatures. A method signature describes the parameters and return type of a particular method. To illustrate, FIG. 1B depicts a method signature 120 in an internal method representation 122 which is generated by a virtual machine. The method signature 120 corresponds to a method foo 124. The method foo 124 has four parameters, namely, byte, java.lang.string, double and java.util.date. The signature 120 represents the data type of these four parameters. As such, the character "B" indicates that the first parameter is a "byte" type, "Ljava/lang/string" indicates that the second parameter is a "string" type, "D" indicates that the third parameter is a "double" type, and "Ljava/util/Date" indicates that the fourth parameter is a "date" type. It should be noted that "string" and "date" represent reference data types. Accordingly, there may be a need to access the string and date classes in order to execute the method. In other words, there may be a need to locate the internal representation for classes associated with the reference data types (e.g., string and date data types). This means that to execute a method, the virtual machine has to do some processing to parse the signature and determine the data type for the parameters.

One problem with the conventional representation of Java data types is that the method signatures have to be read sequentially since data types can have various lengths. This means that the method signature has to be sequentially scanned from the beginning in order to access a particular parameter's data type. Furthermore, after the data type has been determined, there is a need to perform more processing to locate the internal class representation of the method's parameters (e.g., look it up in a table). The amount of processing required to sequentially read and then find the appropriate internal class representation can adversely affect the performance of virtual machines. This can seriously hinder the performance of virtual machines, especially those operating with relatively limited computing power (e.g., embedded systems).

In view of the foregoing, there is a need for improved techniques for representation of Java data types in Java computing environments.

SUMMARY OF THE INVENTION

Broadly speaking, the present invention relates to improved techniques for representation of Java data types in Java computing environments. In accordance with one aspect of invention, a word consisting of four bytes is used to represent primitive and non-primitive Java data types. As will be appreciated, the Java data type representations can be used by a Java virtual machine to efficiently represent various Java data types encountered in Java computing environments. As a result, various components that can represent Java data types (e.g., signatures of Java methods) can efficiently be constructed.

The invention can be implemented in numerous ways, including as a method, an apparatus, a computer readable medium, and a database system. Several embodiments of the invention are discussed below.

As a Java data type representation suitable for use by a Java virtual machine, one embodiment of the invention includes a first, a second, a third, and a fourth byte which are sequentially arranged. The first byte includes a Java data type indicator which can indicate whether the represented Java data type is a primitive Java data type or a non-primitive Java data type. The first, second, third, and fourth bytes collectively represent a reference to a non-primitive Java data type when the Java data type indicator indicates that the Java data type is a non-primitive Java data type. The second byte represents a primitive Java data type when the Java data type indicator indicates that the Java data type is a primitive Java data type.

As a method of representing Java data types in a Java computing environment, one embodiment of the invention include the acts of: allocating a word consisting of a first, a second, a third, and a fourth byte which are sequentially arranged, designating one or more bits of the word to be a Java data type indicator; determining whether the Java data type is a primitive Java data type or a non-primitive Java data type; assigning a Java data type indicator to a first value when it is determined that the Java data type is a non-primitive Java data type; and assigning a second value when it is determined that the Java data type is a primitive Java data type.

As a method of determining Java data types represented by a word consisting of a first, a second, a third, and a fourth byte being arranged sequentially, one embodiment of the invention includes the acts of: reading a first and a second bit of the first byte, determining whether the first and second bits of the first byte are both equal to zero, reading the word as a reference to a non-primitive Java data type when it is determined that the first and second bits of the first byte are both equal to zero; and reading the second byte as a primitive Java data type indicator when it is determined that the first and second bits of the first byte are not both equal to zero.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

The present invention pertains to improved techniques for representation of Java data types in Java computing environments. In accordance with one aspect of invention, a word consisting of four bytes is used to represent primitive and non-primitive Java data types. As will be appreciated, the Java data type representations can be used by a Java virtual machine to efficiently represent various Java data types encountered in Java computing environments. As a result, various components that can represent Java data types (e.g., signatures of Java methods) can efficiently be constructed.

Embodiments of the invention are discussed below with reference to FIGS. 2A–4. However, those skilled in the art will readily appreciate that the detailed description given herein with respect to these figures is for explanatory purposes only as the invention extends beyond these limited embodiments.

Figure 1A:
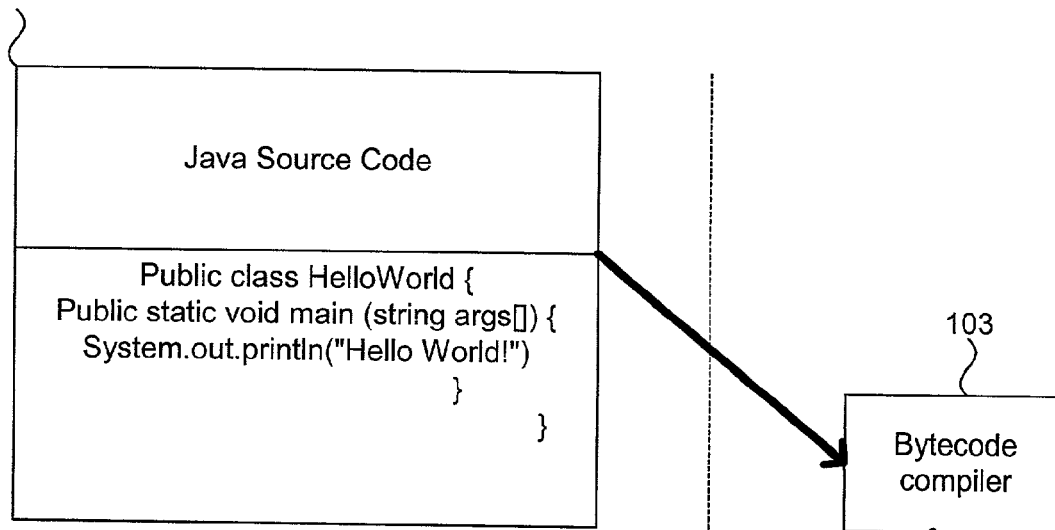
FIG. 1A shows a progression of a simple piece of Java source code through execution by an interpreter, the Java virtual machine.
Figure 1A:
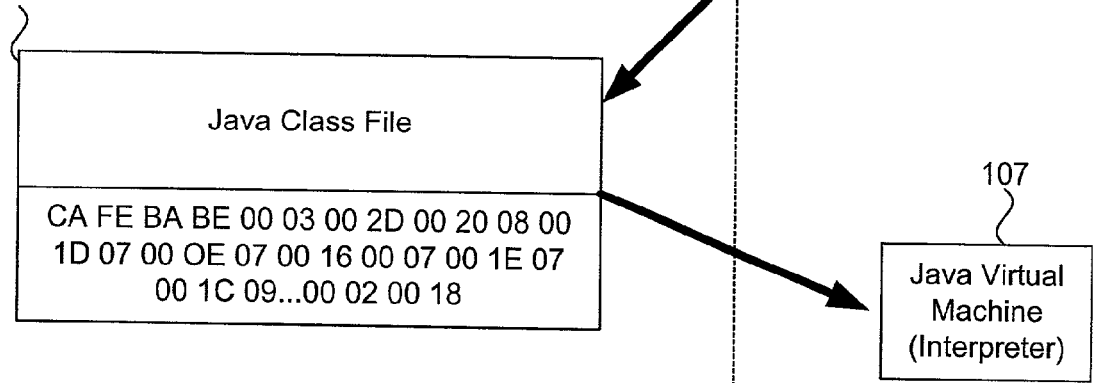
Figure 1B:
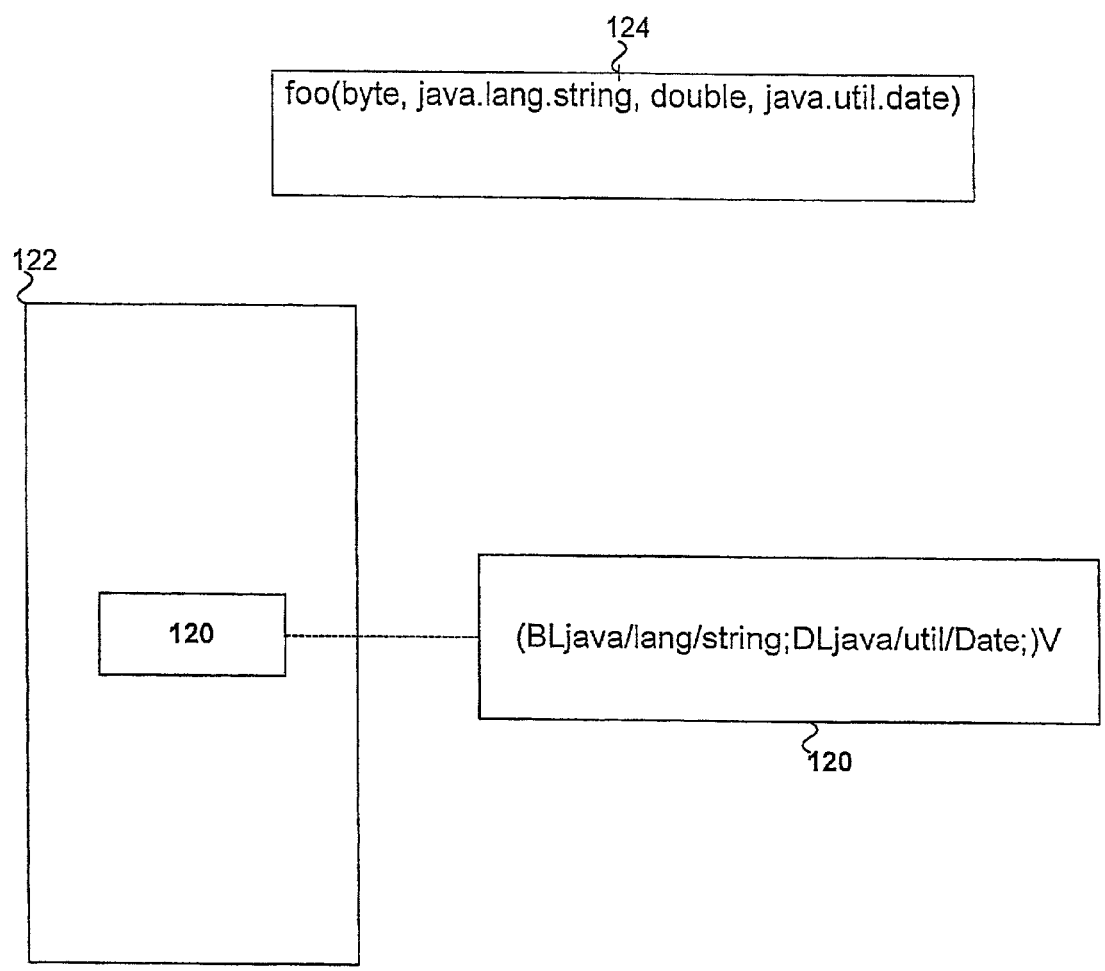
FIG. 1B depicts a method signature in an internal method representation which is generated by a virtual machine.
Figure 2A:
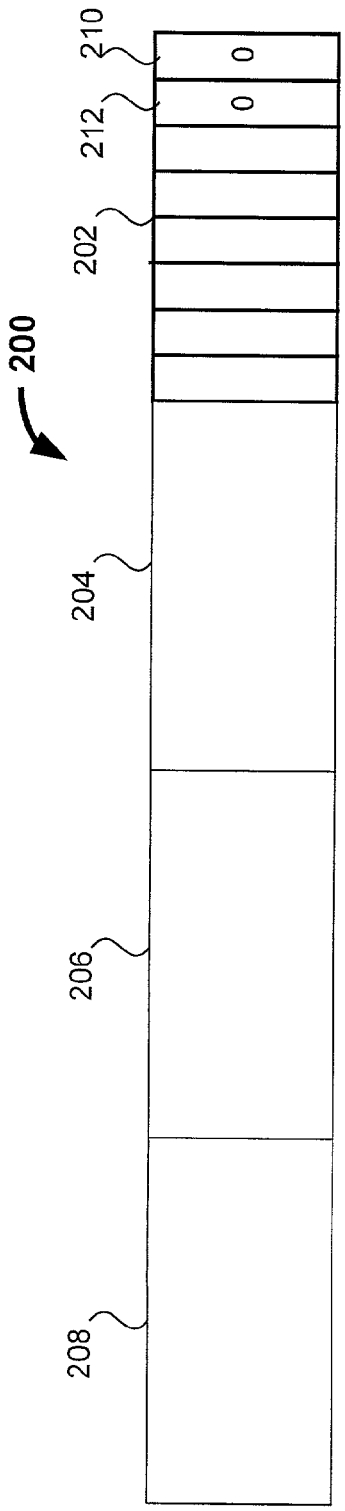
FIGS. 2A–B illustrate Java data type representations in accordance with one embodiment of the invention.

FIG. 2A illustrates a Java data type representation 200 in accordance with one embodiment of the invention. The Java data type representation 200 is suitable for representation of non-primitive Java data types. In the described embodiment, the Java data type representation 200 is stored as a word (4 bytes). In other words, the Java type representation 200 consists of a first byte 202, a second byte 204, a third byte 206 and a fourth byte 208.

As shown in FIG. 2A, a first bit 210 and a second bit 212 of the first byte 202 are set to zero to indicate that the data type represented is a non-primitive Java data type. As will be appreciated, the Java data type representation 200 can be used as a reference to a non-primitive Java data type. In other words, a reference to a non-primitive Java data type can be stored in the 32 bits of the word consisting of the first byte 202, a second byte 204, a third byte 206 and a fourth byte 208. It should be noted that references are typically aligned by four (i.e., first and second bits of the first byte are set to zero). Thus, setting the first bit 210 and second bit 212 to zero is an efficient way of indicating that the data type representation 200 represents a non-primitive Java data type. Accordingly, the data type representation 200 can be a reference to an internal representation of a Java class (i.e., a non-primitive Java data type). As such, this representation can be used by a Java virtual machine to efficiently represent non-primitive Java data types.

Figure 2B:
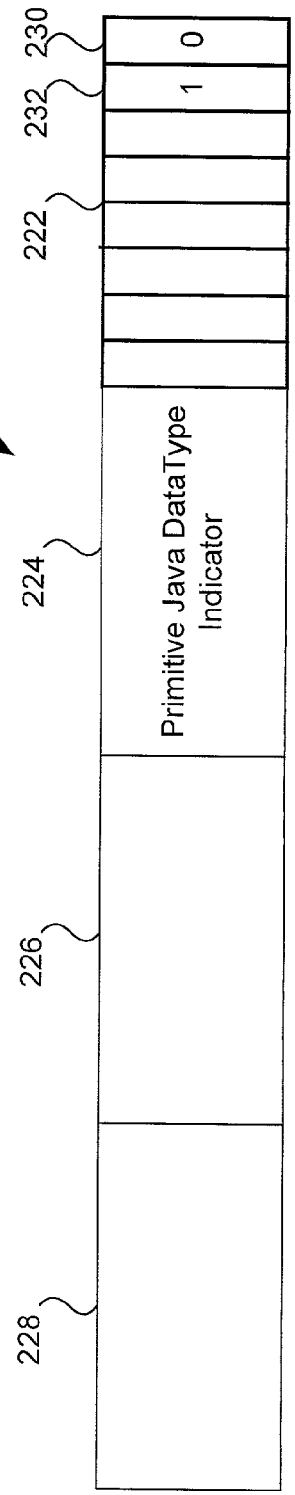

FIG. 2B illustrates a Java data type representation 220 in accordance with another embodiment of the invention. The Java data type representation 220 is suitable for representation of primitive Java data types. Similar to the Java data type representation 200 depicted in FIG. 2A, the Java data type representation 220 consists of a first byte 222, a second byte 224, a third byte 226 and a fourth byte 228. However, the first bit 230 and second bit 232 of the first byte 222 are respectively set to zero and one to indicate that the data type represented is a non-primitive Java data type. In addition, the second byte 224 is used as a primitive Java type indicator. As such, the value stored in the second byte 224 can be used to uniquely identify a Java primitive data type (e.g., integer, byte, etc.) It should be noted that the first bit 230 and second bit 232 of the first byte 222 are respectively set to one and zero to indicate that the data type represented is a non-primitive Java data type.

Figure 3:
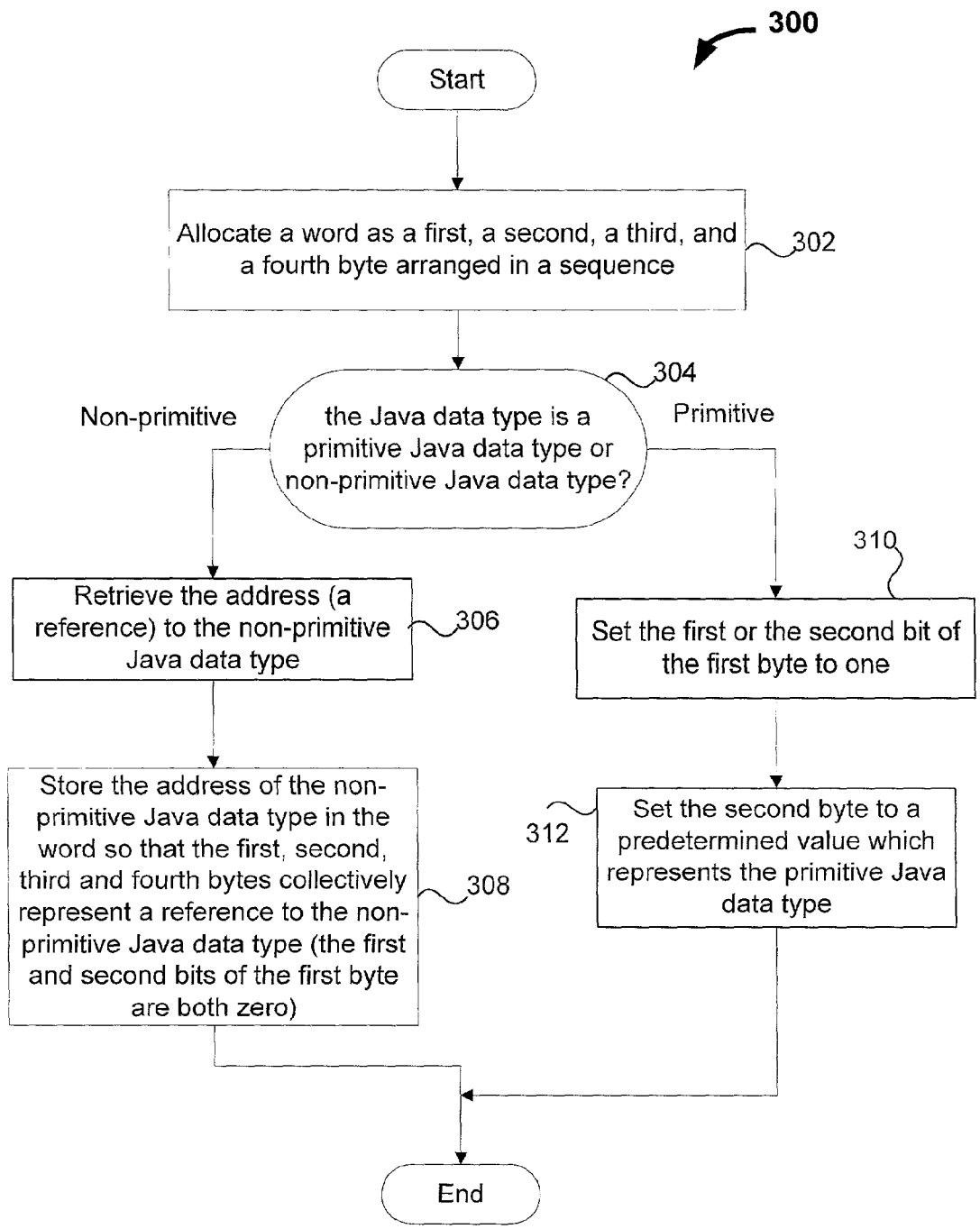
FIG. 3 illustrates a method for representing Java data types.

Accordingly, the Java data type representations illustrated in FIGS. 2A and 2B can be used to represent various data types encountered in the Java programming environment. As will be appreciated, the Java data type representations 200 and/or 220 can be used to efficiently construct, for example, signatures of Java methods. FIG. 3 illustrates a method 300 for representing Java data types. The method 300 can, for example, be used to construct signatures for Java methods.

Initially, at operation 302, a word is allocated. The word consists of a first, a second, a third and a fourth byte, which are arranged sequentially in memory. Next, at operation 304, a determination is made as to whether the data type that is to be represented is a primitive or non-primitive Java data type. If it is determined at operation 304 that the Java data type that is to be represented is a non-primitive Java data type, the method 300 proceeds to operation 306 where the address of the non-primitive Java data type is retrieved. This address can be a reference to an internal Java class representation. Thereafter, at operation 308, the address is stored in the word represented by the first, second, third and fourth bytes. It should be noted that the first and second bits of the first byte are both zero since references are aligned by four. The method 300 ends following operation 308.

On the other hand, if it is determined at operation 304 that the Java data type that is to be represented is a primitive Java data type, the method 300 proceeds to operation 310 where the first or the second bit of the first byte in the word is set to one. Thereafter, at operation 312, the second byte in the word is set to a predetermined value which represents a primitive Java data type. The method 300 ends following operation 312.

Figure 4:
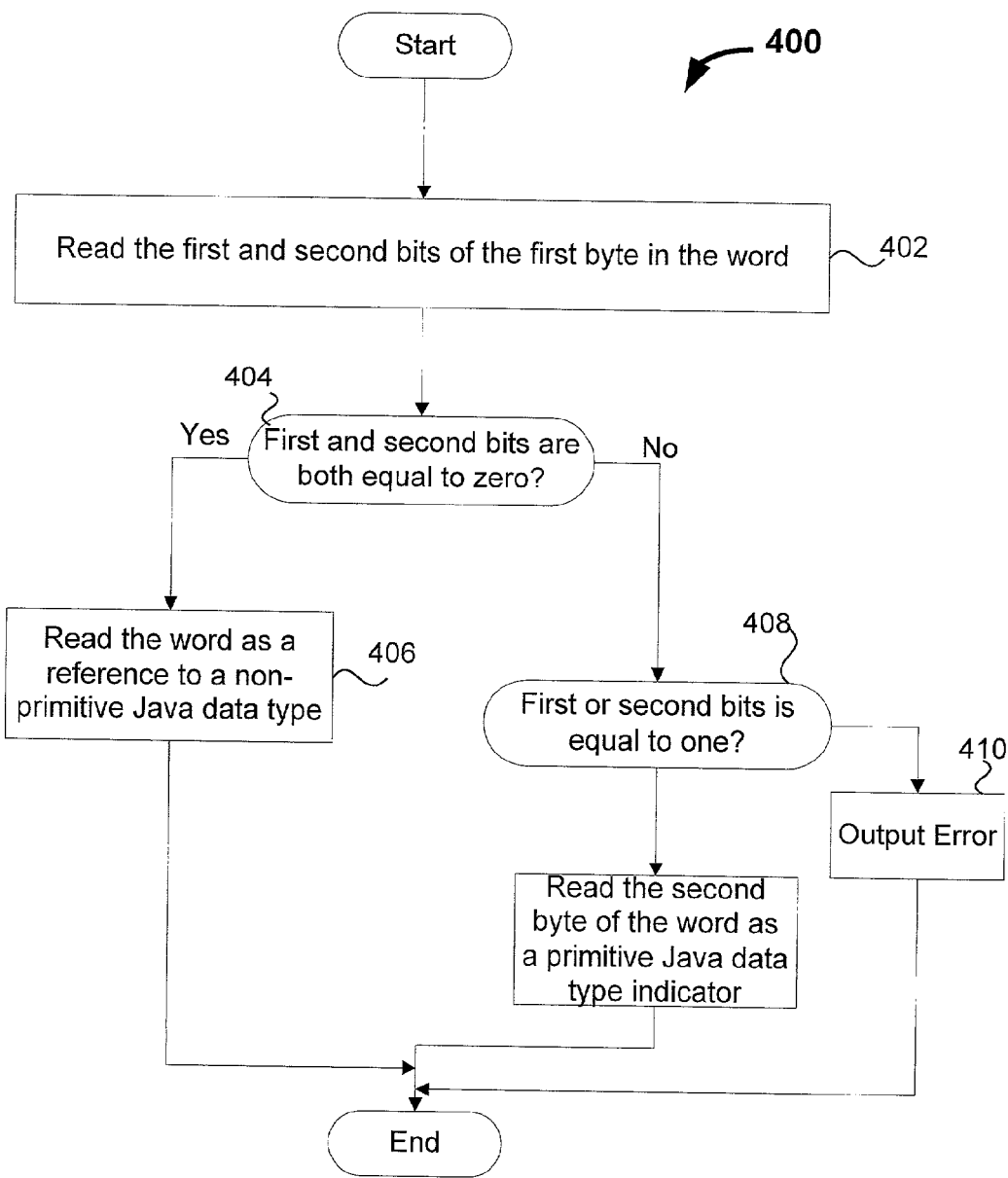
FIG. 4 illustrates a method for determining the Java data type represented by a word.

FIG. 4 illustrates a method 400 for determining the Java data type represented by a word. The method can, for example, be used to determine what Java data type is being represented by the data type representations 200 and 220 of FIGS. 2A and 2B. Initially, at operation 402, the first and second bits of the first byte in the word are read. Next, at operation 404, a determination is made as to whether the first and second bits of the first byte are both equal to zero. If it is determined at operation 404 that the first and second bits of the first byte are both equal to zero, the method 400 proceeds to operation 406 where the word is read as a reference to a non-primitive Java data type. As noted above, this reference can be a reference to an internal Java class representation. Method 400 ends following operation 406.

On the other hand, if it is determined at operation 404 that the first and second bits of the first byte are not both equal to zero, the method 400 proceeds to operation 408 where a determination is made as to whether the first or second bit of the first byte in the word is equal to one. If it is determined at operation 408 that neither the first nor the second bit is equal to one, the method 400 proceeds to operation 410 where an error is output. However, if it is determined at operation 408 that either the first or the second bit of the first byte in the word is equal to one, the method 400 proceeds to operation 412 where the second byte of the word is read as a primitive Java data type indicator. As will be appreciated, the Java data type indicator can uniquely identify a primitive data type indicator (e.g., integer, byte, etc.). The method 400 ends following operation 412.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer readable medium including at least computer program code for a Java data type representation suitable for use by a Java virtual machine, said Java data type representation consisting of:
   a first, a second, a third, and a fourth byte which are sequentially arranged inside said virtual machine;
   wherein said first byte includes a Java data type indicator, said Java data type indicator indicating whether the represented Java data type is a primitive Java data type or a non-primitive Java data type;
   wherein said first, second, third, and fourth bytes collectively represent a reference to a non-primitive Java data type when said Java data type indicator indicates that the Java data type is a non-primitive Java data type; and
   wherein said second byte represents a primitive Java data type when said Java data type indicator indicates that the Java data type is a primitive Java data type.

2. A computer readable medium recited in claim 1, wherein a first and a second bit of said first byte are both set to zero to indicate that the Java data type represented is a non-primitive Java data type; and
   wherein Java references are aligned by four.

3. A computer readable medium recited in claim 1, wherein said first, second, third, and fourth bytes collectively represent a reference to an internal class representation when said Java data type indicator indicates that the Java data type is a non-primitive Java data type.

4. A computer readable medium as recited in claim 1, wherein said Java data type representation is read by a Java virtual machine.

5. A computer readable medium as recited in claim 1, wherein a first or a second bit of said first byte are set to one to indicate that the Java data type represented is a primitive Java data type.

6. A computer readable medium as recited in claim 1, wherein said data type representation is used to represent a Java method signature.

7. A computer-implemented method of representing Java data types inside a virtual machine, said method comprising:
   allocating, during load time, a word, said word consisting of a first, a second, a third, and a fourth byte which are sequentially arranged inside said virtual machine;
   designating, during load time, one or more bits of said word to be a Java data type indicator;

determining at load time whether a Java data type is a primitive Java data type or a non-primitive Java data type;

assigning at load time a Java data type indicator to a first value when said determining determines that said Java data type is a non-primitive Java data type; and assigning at load time a Java data type indicator to a second value when said determining determines that said Java data type is a primitive Java data type.

8. A computer-implemented method as recited in claim 7, wherein said first byte includes said Java data type indicator, said Java data type indicator indicating whether the represented Java data type is a primitive Java data type or a non-primitive Java data type; and wherein said computer-implemented method further comprises:

assigning one or more bits of said Java data type indicator to said first or second value.

9. A computer-implemented method as recited in claim 8, wherein said first, second, third, and fourth bytes collectively represent a reference to a non-primitive Java data type when said Java data type indicator indicates that the Java data type is a non-primitive Java data type; and wherein said second byte represents a primitive Java data type when said Java data type indicator indicates that the Java data type is a primitive Java data type.

10. A computer-implemented method as recited in claim 9, wherein a first and a second bit of said first byte are both set to zero to indicate that the Java data type represented is a non-primitive Java data type; and wherein Java references are aligned by four.

11. A computer -implemented method as recited in claim 10, wherein said first, second, third, and fourth bytes collectively represent a reference to an internal class representation when said Java data type indicator indicates that the Java data type is a non-primitive Java data type.

12. A computer-implemented method as recited in claim 9, wherein a first or a second bit of said first byte are set to one to indicate that the Java data type represented is a primitive Java data type.

13. A computer-implemented method as recited in claim 7, wherein said computer-implemented method is performed by a Java virtual machine.

14. A computer-implemented method as recited in claim 7, wherein said word represents a data type associated with a Java method signature.

15. A computer readable medium including at least computer program code for determining Java data types at runtime, said computer readable medium comprising:

computer program code for generating at load time a word inside a virtual machine, said word consisting of a first, a second, a third, and a fourth byte being arranged sequentially inside said virtual machine; said computer readable medium comprising:

computer program code for reading by said virtual machine at runtime a first and a second bit of said first byte;

computer program code for determining at runtime whether said first and second bits of said first byte are both equal to zero;

computer program code for reading at runtime said word as a reference to a non-primitive Java data type when said determining determines that said first and second bits of said first byte are both equal to zero; and computer program code for reading at runtime said second byte as a primitive Java data type indicator when said determining determines that said first and second bits of said first byte are not both equal to zero.

16. A computer readable medium as recited in claim 15, wherein said computer readable medium further comprises:

computer program code for determining whether said first or second bits of said first byte are equal to one when said determining determines that said first and second bits of said first byte are not both equal to zero.

17. A computer readable medium as recited in claim 15, wherein said reference to a non-primitive Java data type is a reference to an internal class representation of a Java class in a Java virtual machine.

18. A computer readable medium as recited in claim 15, wherein said computer readable medium is stored by a Java virtual machine.

19. A computer readable medium as recited in claim 15, wherein said word represents a data type associated with a Java method signature.

20. A computer system, comprising: at least one processor which receives computer program instructions for a virtual machine, wherein said virtual machine is capable of:

allocating, during load time, a word consisting of a first, a second, a third, and a fourth byte which are sequentially arranged.

designating, during load time, one or more bits of said word to be a Java data type indicator;

determining at load time whether a Java data type is a primitive Java data type or a non-primitive Java data type;

assigning at load time a Java data type indicator to a first value when said determining determines that said Java data type is a non-primitive Java data type; and assigning at load time a Java data type indicator to a second value when said determining determines that said Java data type is a primitive Java data type.

21. A computer system as recited in claim 20, wherein said virtual machine is further capable of:

reading at runtime a first and a second bit of said first byte;

determining at runtime whether said first and second bits of said first byte are evaluated to be equal to a pre-determined value;

reading at runtime said word as a reference to a non-primitive Java data type when said determining determines that said first and second bits of said first byte are evaluated to be equal to said pre-determined value; and reading at runtime said second byte as a primitive Java data type indicator when said determining determines that said first and second bits of said first byte are not evaluated to be equal to said pre-determined value.

22. A computer system as recited in claim 21, wherein said pre-determined value is zero.

* * * * *